United States Patent
Omansky et al.

(10) Patent No.: US 8,732,125 B2
(45) Date of Patent: May 20, 2014

(54) SYSTEMS AND METHODS FOR CONSTRUCTION FIELD MANAGEMENT AND OPERATIONS WITH BUILDING INFORMATION MODELING

(75) Inventors: Adam H. Omansky, Charlestown, MA (US); Joshua L. Kanner, Cambridge, MA (US)

(73) Assignee: Autodesk, Inc., San Rafael, CA (US)

( * ) Notice: Subject to any disclaimer, the term of this patent is extended or adjusted under 35 U.S.C. 154(b) by 303 days.

(21) Appl. No.: 13/042,981

(22) Filed: Mar. 8, 2011

(65) Prior Publication Data

US 2012/0066178 A1    Mar. 15, 2012

Related U.S. Application Data

(60) Provisional application No. 61/311,903, filed on Mar. 9, 2010.

(51) Int. Cl.
*G06F 17/30* (2006.01)

(52) U.S. Cl.
CPC .............................. *G06F 17/30575* (2013.01)
USPC ........................................................ 707/621

(58) Field of Classification Search
CPC ................... G06F 17/30289; G06F 17/30575; G06F 17/30557
USPC ................................................ 707/802–803
See application file for complete search history.

(56) References Cited

U.S. PATENT DOCUMENTS

| 5,761,674 | A  | 6/1998  | Ito |
| 6,859,768 | B1 | 2/2005  | Wakelam et al. |
| 7,313,759 | B2 * | 12/2007 | Sinisi .............................. 715/203 |
| 2004/0093342 | A1 | 5/2004  | Arbo et al. |
| 2006/0044307 | A1 | 3/2006  | Song |
| 2006/0193262 | A1 | 8/2006  | McSheffrey et al. |
| 2007/0088704 | A1 | 4/2007  | Bourne et al. |
| 2007/0168325 | A1 | 7/2007  | Bourne et al. |
| 2007/0168374 | A1 | 7/2007  | Bourne et al. |
| 2007/0285424 | A1 | 12/2007 | Cheng et al. |

(Continued)

FOREIGN PATENT DOCUMENTS

| JP | 2008-033530   | 2/2008 |
| KR | 10-2004-0053020 | 6/2004 |

OTHER PUBLICATIONS

International Search Report and Written Opinion in corresponding PCT Application No. PCT/US2011/027531 dated Oct. 4, 2011, 8 pages.

*Primary Examiner* — Thu-Nguyet Le
(74) *Attorney, Agent, or Firm* — Fish & Richardson P.C.

(57) ABSTRACT

The invention generally relates to systems and methods for construction field management and operations with building information modeling. In certain embodiments, the invention provides systems for construction field management and operations, that include a central processing unit (CPU), and storage coupled to the CPU for storing instructions that when executed by the CPU cause the CPU to: encode and map data structures and data sets received from Building Information Modeling software; select particular data structures and data sets relevant to at least one person associated with a construction project; transmit the selected data structures and data sets to a user terminal operated by the person; receive inputs made by the person to the selected data structures and data sets; and synchronize and update the data structures and data sets received from Building Information Modeling software based on the inputs received from the person.

27 Claims, 7 Drawing Sheets

(56) References Cited

U.S. PATENT DOCUMENTS

| | | |
|---|---|---|
| 2008/0015823 A1 | 1/2008 | Arnold et al. |
| 2008/0301153 A1 | 12/2008 | Greer et al. |
| 2009/0037430 A1* | 2/2009 | Mukkamala et al. ........... 707/10 |
| 2010/0106654 A1* | 4/2010 | Simpson et al. .............. 705/300 |

* cited by examiner

SYSTEMS AND METHODS FOR CONSTRUCTION FIELD MANAGEMENT AND OPERATIONS WITH BUILDING INFORMATION MODELING

RELATED APPLICATION

The present application claims the benefit of and priority to U.S. provisional patent application Ser. No. 61/311,903, filed Mar. 9, 2010, the content of which is incorporated by reference herein in its entirety.

FIELD OF THE INVENTION

The invention generally relates to systems and methods for construction field management and operations with building information modeling.

BACKGROUND

Building Information Modeling and Building Information Management refers to object-oriented building development processes with a related set of software applications that utilize multi-dimensional, digital modeling concepts, information technology and software interoperability to design, construct and operate a building project. Building Information Modeling can communicate its details including building geometry, spatial relationships, performance information, geographic information, and quantities and properties of building assemblies, systems, equipment and components to numerous persons associated with a construction project. Building Information Modeling and Building Information Management increase productivity in building design, construction and operations.

In the building design phase, Building Information Modeling is typically used for the conceptual design, schematic design, design development and construction documentation of building assemblies, systems, equipment and components such as: Heating, Ventilating, and Air-Conditioning (HVAC), Electrical, Plumbing, Structural Steel Framing, and Cast-in-Place Concrete, for example. In the building construction phase, Building Information Modeling is typically used for the detailed design coordination and fabrication of building assemblies, systems, equipment and components.

However, in the building construction phase, Building Information Modeling cannot be used for construction field operations out in the field, on the job site and at the point of construction, by construction field personnel. Building Information Modeling tools cannot be used for construction field operations because the tools are designed to communicate details of the design and coordination of the building project including building geometry, spatial relationships, performance information, geographic information, and quantities and properties of building components. Building Information Modeling tools are not designed to communicate details of construction field operations, and accordingly lack the data structures and data sets for construction field operations.

Further, Building Information Modeling tools cannot be used for construction field operations because the tools are generally designed around three-dimensional (3D) visualization or graphic-based representation of a building project, and communicate its details including building geometry and spatial relationships, and are not designed around text-based data structures and data sets that are required for performing construction field operations. Thus, Building Information Modeling tools cannot be used on mobile computer hardware, mobile smart phones, or tablet computers, because Building Information Modeling tools are designed to be used on fixed platforms with large displays.

SUMMARY

The invention generally provides systems and methods for delivering data structures and data sets generated in Building Information Modeling software to construction field operations out in the field, on the job site, and at the point of construction.

In certain aspects, the invention provides systems for construction field management and operations, that include a central processing unit (CPU), and storage coupled to the CPU for storing instructions that when executed by the CPU cause the CPU to: encode and map data structures and data sets received from Building Information Modeling software; select particular data structures and data sets relevant to at least one person associated with a construction project; transmit the selected data structures and data sets to a user terminal operated by the person; receive inputs made by the person to the selected data structures and data sets; and synchronize and update the data structures and data sets received from Building Information Modeling software based on the inputs received from the person. The person may be any person associated with the construction project, such as a field operator, a manager, or an executive.

Systems of the invention may further include instructions that when executed by the CPU cause the CPU to: incorporate new data structures and data sets into the existing data structures and data sets. Systems of the invention may further include instructions that when executed by the CPU cause the CPU to: associate videos with the selected data structures and data sets. Systems of the invention may further include instructions that when executed by the CPU cause the CPU to: associate documents or electronic links to documents with the selected data structures and data sets. Exemplary documents include operations and maintenance manuals, shop drawings, test reports, construction drawings, "as-builts" or as-installed drawings, specifications, riser diagrams, P&ID piping and instrumentation diagrams, submittals, preventive maintenance plans, safety tasks, troubleshooting procedures, start-up procedures, shut-down procedures, emergency operating procedures, warranty, warranty guarantor, and spare parts lists.

In certain embodiments, the data structures and data sets relate to building assemblies, materials, systems, sub-systems, equipment, components, and inter-relations thereof in a building project. In other embodiments, the data structures and data sets relate to at least one field process selected from the group consisting of systems commissioning, issue tracking, field reports, materials tracking, safety, quality assurance, quality control, work lists, punch lists, and handover.

The user terminal may be a terminal that connects to the system via a wireless and/or cellular connection. Alternatively, the user terminal may be a terminal that connects to the system via a wired connection. The user terminal may be a terminal that functions with access to a computer network, cellular network, or the internet. Alternatively, the user terminal may be a terminal that functions without access to a computer network, cellular network, or the internet. Generally, the user terminal is a device that includes a display and is capable of receiving data transferred via an internet or cellular connection. Exemplary user terminals include laptop computers, tablet computers, and portable handheld devices (e.g., smart phones).

Another aspect of the invention provides methods for facilitating construction field management and operations. Methods of the invention involve encoding and mapping on a computer, data structures and data sets received from Building Information Modeling software, selecting particular data structures and data sets relevant to at least one person associated with a construction project, transmitting via an internet and/or cellular connection the selected data structures and data sets to a user terminal operated by the person, receiving, from the user terminal, inputs made by the person to the selected data structures and data sets, and synchronizing and updating the data structures and data sets received from Building Information Modeling software based on the inputs received from the person. Methods of the invention may further involve incorporating new data structures and data sets into the existing data structures and data sets. Methods of the invention may further involve associating documents or electronic links to documents with the selected data structures and data sets. Methods of the invention may further involve associating videos with the selected data structures and data sets.

BRIEF DESCRIPTION OF THE DRAWINGS

FIG. 6 is a drawing showing a representation of the general graphical user interface and list view data display of the field database software application of the present invention.

FIG. 7 is a drawing showing a representation of the detail user interface for attachment and linked documents and other files of the field database software application of the present invention.

DETAILED DESCRIPTION

Figure 1:
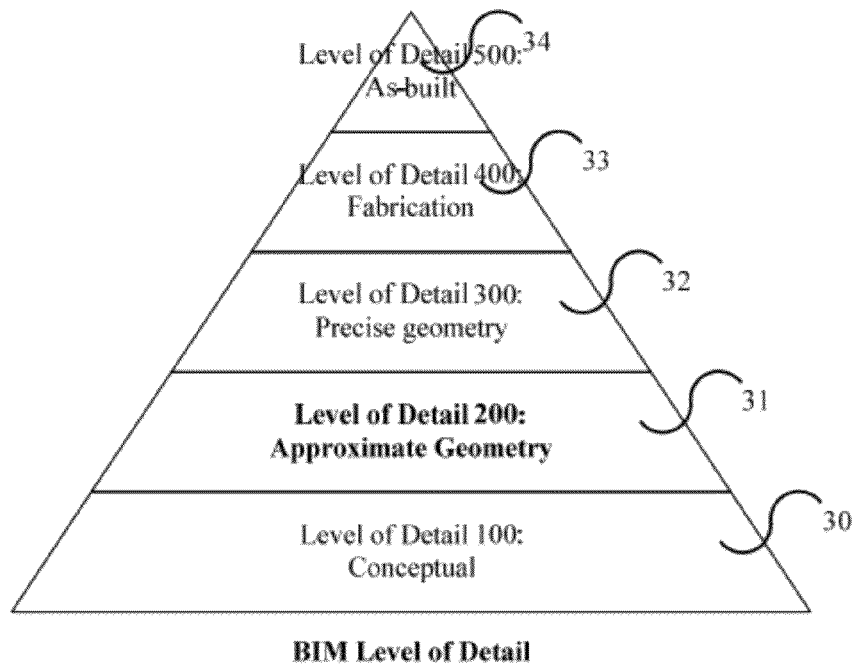
FIG. 1 is a drawing showing a BIM Level of Detail "pyramid" diagram.

In general, the invention pertains to systems and methods for construction field management and operations with building information modeling. FIG. 1 illustrates how systems of the invention are able to deliver data structures and data sets generated in Building Information Modeling software (BIM) to construction field operations out in the field, on the job site, and at the point of construction. In FIG. 1 there is shown a BIM Level of Detail "pyramid" diagram. In the building construction phase, the invention only requires the Level of Detail with Approximate Geometry (Level of Detail 200) 31 as a minimum level of detail with approximate geometry, not precise geometry, in the Field Database for construction field operations, whereas the BIM Database requires varying levels of detail from Conceptual Level of Detail (Level of Detail 100) 30 to As-built Level of Detail (Level of Detail 500) 34 depending on the phase of the project.

In the building construction phase, detailed design coordination and fabrication of building assemblies, systems, equipment and components requires Precise Geometry Level of Detail (Level of Detail 300) 32 and Fabrication Level of Detail (Level of Detail 400) 33. Minimizing the requirements and the related level of detail in the data structures and data sets for proper execution and administration of construction field operations facilitates use by construction field personnel and generally lowers barriers to adoption. Prior to the invention, the building construction phase required Precise Geometry Level of Detail (Level of Detail 300) 32, Fabrication Level of Detail (Level of Detail 400) 33, and As-built Level of Detail (Level of Detail 500) 34 in the BIM Database. With the invention, construction field operations in the building construction phase only require the Level of Detail with Approximate Geometry (Level of Detail 200) 31.

In broad overview, the invention provides systems for construction field management and operations according to embodiments described herein. The system includes a plurality of first computing devices, e.g., remote clients, in communication with a second computing device, e.g., server, over a network. In certain embodiments, the system may also include a third computing device, e.g., database, which is in communication with the server. In general, users of the remote clients can be any person associated with a construction project, e.g., field operators, managers, or executives.

In one embodiment, the network is, for example, a local-area network (LAN), such as a company Intranet, a wide area network (WAN), such as the Internet or the World Wide Web, or a cellular network. Users of the remote clients can be connected to the network through a variety of connections including, but not limited to, standard telephone lines, LAN or WAN links (e.g., T1, T3, 56 kb, X.25), broadband connections (e.g., ISDN, Frame Relay, ATM), or wireless connections. The connections can be established using a variety of communication protocols (e.g., HTTP, TCP/IP, IPX, SPX, NetBios, Ethernet, RS232, and direct asynchronous connections).

Each of the remote clients can be any personal computer, Windows-based terminal, Network Computer, wireless device, information appliance, RISC Power PC, X-device, workstation, mini computer, main frame computer, personal digital assistant, set top box, handheld device, tablet computer (e.g., iPad), smart phone (e.g., iPhone or Blackberry), or other computing device that is capable of both presenting information/data to, and receiving commands from, a user of the remote client, as the case may be. For example, each of the remote clients may include a visual display device (e.g., a computer monitor), a data entry device (e.g., a keyboard), persistent and/or volatile storage (e.g., computer memory), a processor, and a mouse. In one embodiment, each of the remote clients includes a web browser, such as, for example, the Internet Explorer program developed by Microsoft Corporation of Redmond, Wash., to connect to the World Wide Web. The server can be any computing device capable of delivering information/data to, and receiving commands from, the remote clients, over the network.

In certain embodiments, the database is a separate server from the server. Alternatively, the database is part of the server. The database includes storage, or storage is connected to the database, for storing and managing data. In another embodiment, modules or software programs are distributed over several servers in communication with each other over the network, or over another network. Two or more modules may be combined into a single module, such that the functions, as described below, performed by two or more of the modules are performed by the single module. Alternatively, any one of the modules may be implemented as multiple modules, such that the functions, as described below, performed by any one of the modules are performed by the multiple modules.

Certain disclosed embodiments relate to and/or include computer storage. The storage can be in the form of one or more computer-readable mediums having data and/or executable instructions (also called computer programs, code, or software) stored thereon or therein. The software is for performing various computer-implemented processing operations such as any or all of the various operations, functions, and capabilities described herein. The term "computer-readable medium" is used herein to include any medium capable of storing data and/or storing or encoding a sequence of computer-executable instructions or code for performing the processing operations described herein. The media and code can be those specially designed and constructed for the purposes of the invention, or can be of the kind well known and available to those having ordinary skill in the computer and/or software arts. Examples of computer-readable media include computer-readable storage media such as: magnetic media such as fixed disks, floppy disks, and magnetic tape; optical media such as Compact Disc-Read Only Memories ("CD-ROMs") and holographic devices; magneto-optical media such as floptical disks; memory sticks "flash drives" and hardware devices that are specially configured to store and execute program code, such as Application-Specific Integrated Circuits ("ASICs"), Programmable Logic Devices ("PLDs"), Read Only Memory ("ROM") devices, and Random Access Memory ("RAM") devices. Examples of computer-executable program instructions or code include machine code, such as produced by a compiler, and files containing higher level code that are executed by a computer using an interpreter. For example, an embodiment of the invention may be implemented using Java, C++, or other programming language and development tools. Additional examples of instructions or code include encrypted code and compressed code. Other embodiments of the invention can be implemented in whole or in part with hardwired circuitry in place of, or in combination with, program instructions/code.

Figure 2:
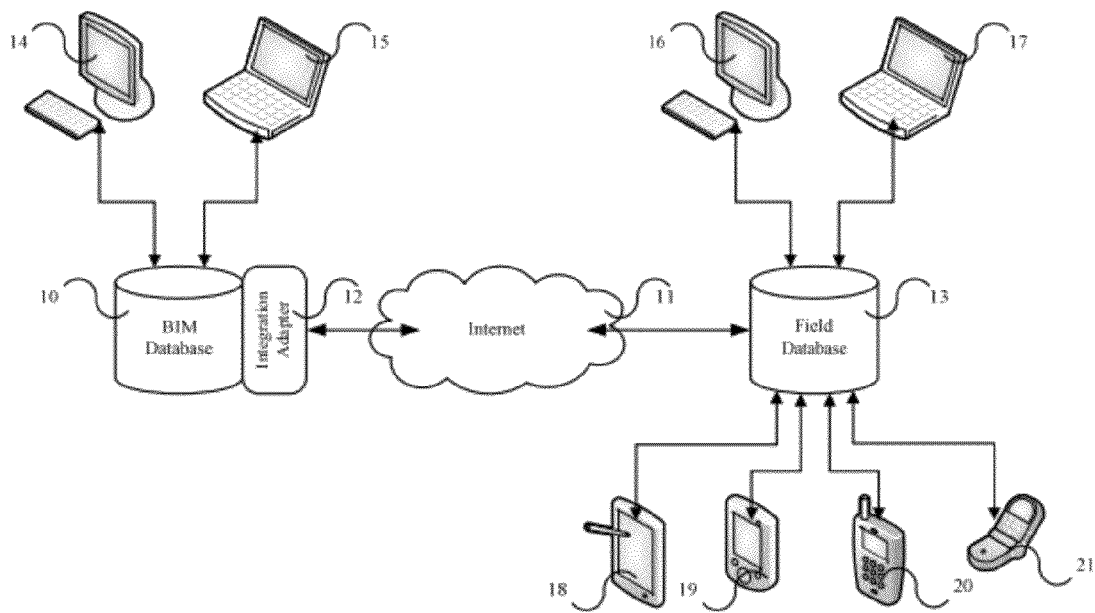
FIG. 2 is a drawing showing an exemplary embodiment of systems of the invention.

Referring is now made to FIG. 2, which shows an illustrative embodiment of the invention. In FIG. 2 there is shown a network of a Building Information Modeling database 10, field database 13, and related peripheral hardware devices 18-21. The BIM Database 10 and the Field Database 13 connect via an automated, bi-directional Integration Adapter 12 over the Internet 11.

Building Information Modeling software applications utilize multi-dimensional, digital modeling concepts, information technology and software interoperability to design, construct and operate a building project. Building Information Modeling software can communicate project details including building geometry, spatial relationships, performance information, geographic information, and quantities and properties of building assemblies, systems, equipment and components to numerous persons associated with a construction project. In the building design phase, Building Information Modeling software is typically used for the conceptual design, schematic design, design development and construction documentation of building assemblies, systems, equipment and components such as: Heating, Ventilating, and Air-Conditioning (HVAC), Electrical, Plumbing, Structural Steel Framing, and Cast-in-Place Concrete, for example. In the building construction phase, Building Information Modeling is typically used for the detailed design coordination and fabrication of building assemblies, systems, equipment and components. Building Information Modeling is further described for example in Arnold et al. (U.S. patent application number 2008/0015823), Cheng et al. (U.S. patent application number 2007/0285424), Song (U.S. patent application number 2006/0044307), Wakelam et al. (U.S. Pat. No. 6,859,768), Ito (U.S. Pat. No. 5,761,674), and Bourne (U.S. patent application numbers 2007/0168325, 2007/0168374, and 2007/0088704), the content of each of which is incorporated by reference herein in it entirety. Building Information Modeling software is commercially available from, for example, Autodesk (San Rafael, Calif.).

Figure 10A:
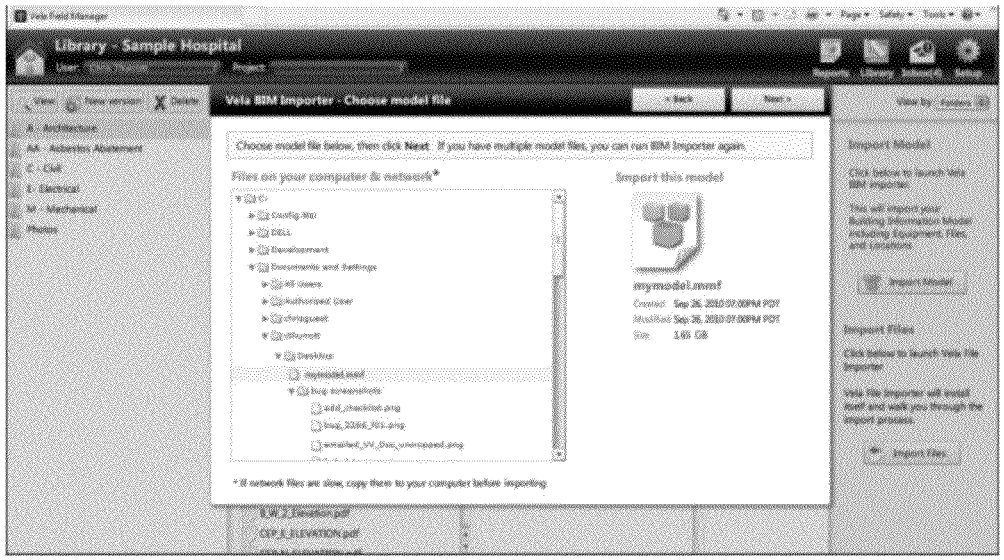
FIGS. 10A and 10B are a screen shots of systems of the invention. The screen shots show importing or receiving data structures and data sets from Building Information Modeling software. The received data structures and data sets are encoded and mapped using systems of the invention.
Figure 10B:
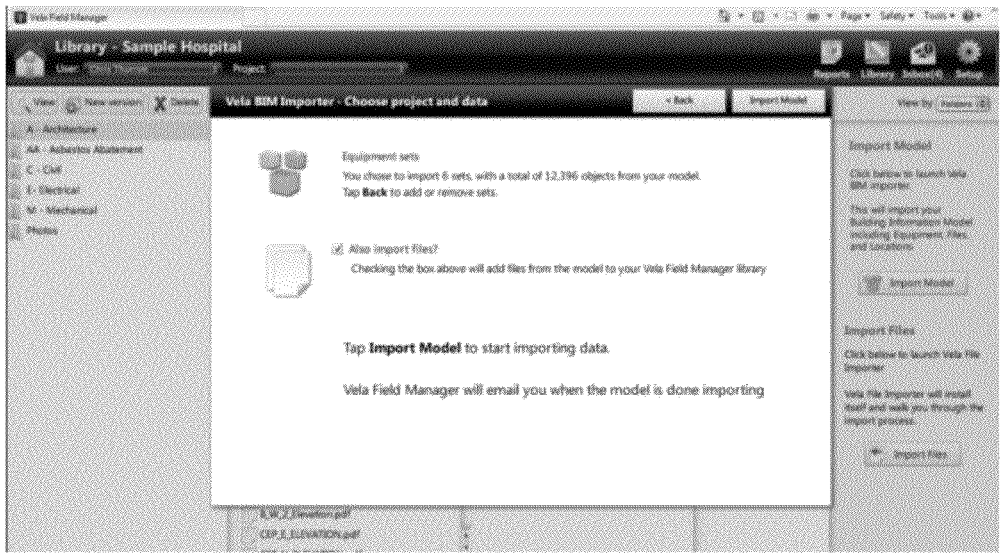
Figure 11:
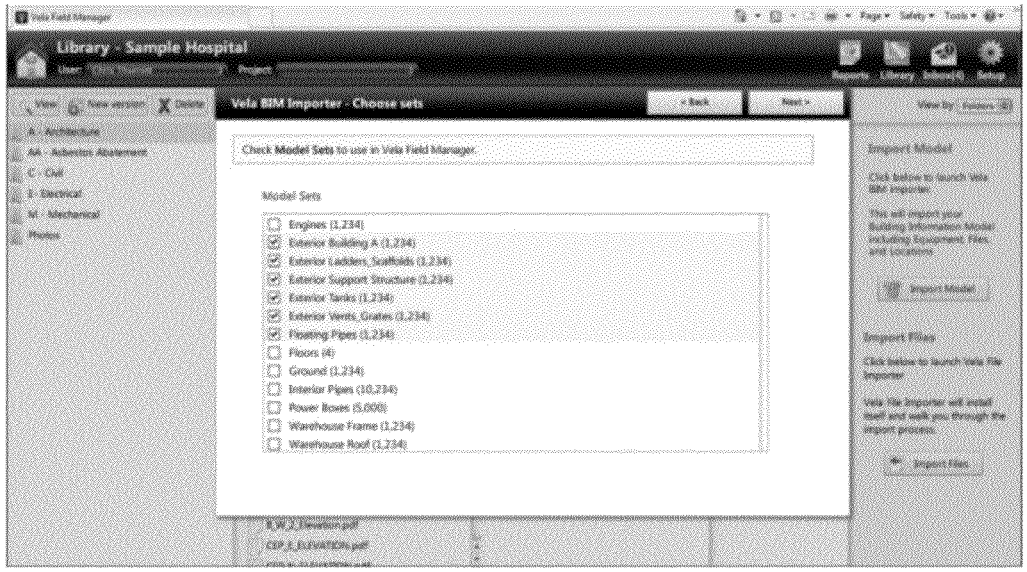
FIG. 11 is a screen shot of object and attribute selection using systems of the invention to encode and map data structures and data sets from Building Information Modeling software.
Figure 12:
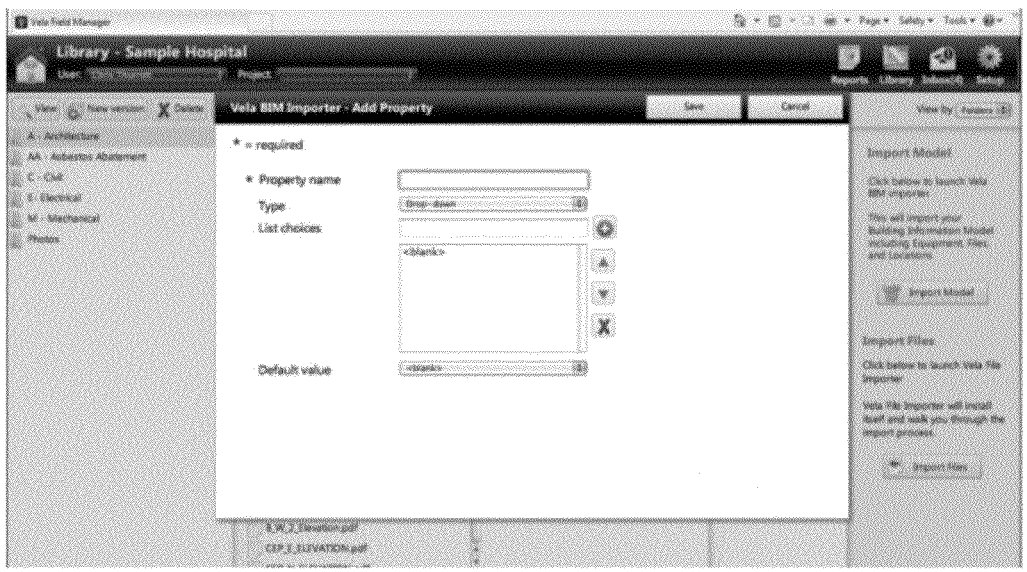
FIG. 12 is a screen shot of adding a missing property using systems of the invention.

The automated, bi-directional Integration Adapter 12 uses a set of rules in Extensible Markup Language (XML) or JavaScript Object Notation (JSON) to encode and to map electronically the data structures and data sets of building assemblies, systems, equipment and components between the BIM Database 10 and the Field Database 13. A file from the Building Information Modeling software is selected (FIGS. 10A and 10B). Then, sets of objects and sets of attributes within the file are selected (FIG. 11). The objects from the Building Information Modeling software are keyed to the field database objects with globally unique identifiers (GUID). Then, attributes from the Building Information Modeling software are mapped to the objects in the field database and are linked to the database. Irrelevant attributes are ignored and any missing attributes are added by the adapter (FIG. 12).

The set of rules in XML or JSON is modified by the end-user, based on the building assemblies, systems, equipment and components for each project. The invention transfers data structures and data sets of building assemblies, systems, equipment and components from the BIM Database 10 to the Field Database 13, and vice versa from the Field Database 13 to the BIM Database 10 via the Integration Adapter 12 over the Internet 11.

The invention selects and filters the data structures of building assemblies, systems, equipment and components from the BIM Database 10 to the Field Database 13, via the Integration Adapter 12 and set of rules in XML or JSON, to include only data structures relevant to and material in value to the construction field operation, and to exclude data structures not relevant to and immaterial in value to the construction field operation. For example, in a Mechanical Commissioning field operation, the invention selects and filters only data structures related to Heating, Ventilating, and Air-Conditioning (HVAC) assemblies, systems, equipment and components, such as Air Handling Units (AHUs), and not data structures related to other building assemblies, systems, equipment and components, such as Cast-in-Place Concrete. Different construction field operations require different data structures for proper execution and administration.

Further, the invention selects and filters the data sets from the BIM Database 10 to the Field Database 13, via the Integration Adapter 12 and set of rules in XML or JSON, to include only data sets relevant to and material in value to the construction field operation, and to exclude data sets not relevant to and immaterial in value to the construction field operation. For example, in a Mechanical Commissioning field operation, the invention selects and filters only data sets related to the Mechanical Commissioning of Heating, Ventilating, and Air-Conditioning (HVAC) assemblies, systems, equipment and components, such as System Number, System Name, Equipment Number, Equipment Name, Manufacturer, Serial Number, Model Number, and Type, and not data sets related to building geometry, spatial relationships and geographic information. Different construction field operations require different data sets for proper execution and administration.

Figure 3:
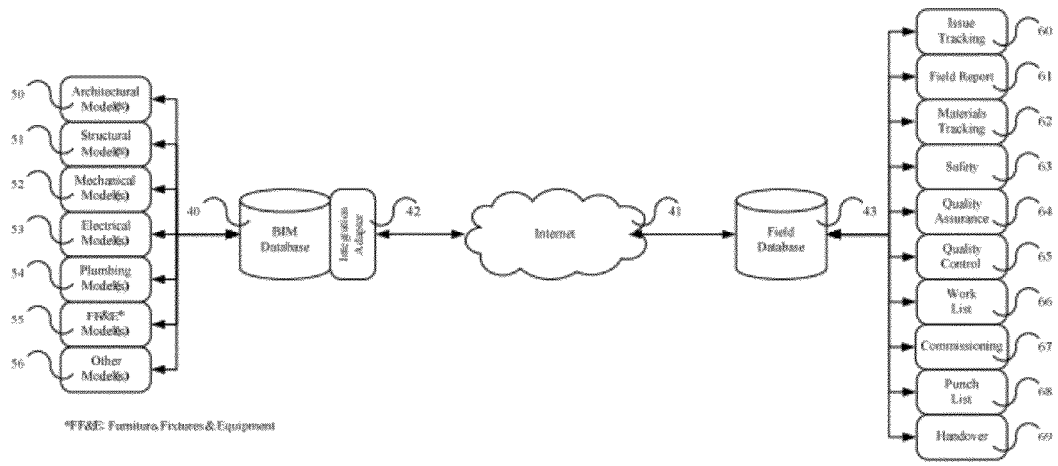
FIG. 3 is a drawing showing the network of the BIM Database, Field Database, Building Information Models and Construction Field Operations of the present invention.

FIG. 3 provides greater detail regarding filtering of data structures and data sets. In FIG. 3 there is shown a diagram of the network of the BIM Database 40, Field Database 43, Building Information Models 50-56 and Construction Field Operations 60-69 of the present invention. One or many construction field operations or field processes, such as Issue Tracking 60, Field Report 61, Materials Tracking 62, Safety 63, Quality Assurance (QA) 64, Quality Control (QC) 65, Work List 66, Commissioning (Cx) 67, Punch List 68, and Handover 69, are selected for linking with Building Information Modeling (BIM) and Building Information Management (BIM). The invention generates one or many filters in the Building Information Model, to group the Building Information Model objects related to the one or many selected construction field operations or field processes.

For example, if Commissioning (Cx) 67 is selected for linking with Building Information Modeling and Building Information Management, then filters are created in the Building Information Model to group objects in the Mechanical Model(s) 52 and the Electrical Model(s) 53, such as Air Handling Units (AHUs), for example. The filtered and grouped Building Information Model objects and respective parameters are then loaded into the Field Database 43 via the Integration Adapter 42 over the Internet 41, and are ready for use out in field, on the job site and at the point of construction, by construction field personnel.

Referring back to FIG. 2, many end-users may interact with BIM data from the BIM Database 10 out in the field, on the job site and at the point of construction. End-users may create, read and update BIM data, consolidate the new and modified information automatically, and then add the new and modified information to the existing data structures and data sets. End-users may author and access information in an empirical data set observed and derived from construction field operations. The Field Database 13 enables end-users to include only data sets relevant to and material in value to the construction field operation, and to exclude data sets not relevant to and immaterial in value to the construction field operation. The Field Database 13 is an empirical database related to one or many construction field operations. For example, in a Mechanical Commissioning field operation, the invention enables end-users to author and access data sets, such System Status, System Status Dates and Times, Equipment Status and Equipment Status Dates and Times, relevant to and material in value to the construction Mechanical Commissioning, and to exclude data sets not relevant to and immaterial in value to other construction field operations and to other details including building geometry, spatial relationships and geographic information.

Architects, engineers, virtual design coordinators and like design and construction personnel author and access data structures and data sets of building assemblies, systems, equipment and components in the BIM Database 10 generally via Desktop Personal Computers 14 and Laptop Personal Computers 15 indoors in the office environment. Construction field personnel author and access data structures and data sets of building assemblies, systems, equipment and components in the Field Database 13 via Desktop Personal Computers 16 and Laptop Personal Computers 17 indoors in the job site office environment, such as in a temporary job trailer. Construction field personnel may author and access data structures and data sets of building assemblies, systems, equipment and components in the Field Database 13 via Tablet Personal Computers, Slate Personal Computers and Netbooks 18, Personal Desktop Assistants 19, Smart Phones 20, Cellular Phones 21, and other mobile platforms with portable displays.

The present invention allows one or many end-users, such as construction field personnel and other construction project stakeholders, to work disconnected from the Internet 11, access data structures and data sets of building assemblies, systems, equipment and components and other information in the Field Database 13, and access and author information related to the data structures and data sets in order to perform construction field operations. Working disconnected from the Internet 11 is important for performing construction field operations as wireless Internet access and other forms of wireless networking, such as IEEE 802.11, Wi-Fi and WiMax, HiperLan, OpenAir, etc., may not be always available and may be limited in signal strength out in the field, on the job site and at the point of construction, due to the constraints of the job site and wireless signal obstructions from building assemblies, systems, equipment and components.

The present invention allows one or many end-users to synchronize information and share information in a bi-directional manner, to both send information to other end-users and receive information from other end-users, such as data structures and data sets of building assemblies, systems, equipment and components and other information, via a centralized server Field Database 13, when connected to the Internet 11. When end-users connect to the Internet, via a wireless connection or wired connection, and then synchronize information and share information, the present invention uses synchronization rules and business logic to resolve and to prevent conflicts when combining the information from many end-users in the centralized server Field Database 13, over the duration of the construction project. The objects from the Building Information Modeling software are keyed to the field database as described above. The rules are set as "last change wins" rules at the object level and attribute level unless otherwise changed. Each change is read-only, date/time stamped and read-only author stamped so that there is a secure history log/audit trail of changes. Permissions to create, read, update, and delete at the object level and attribute level is set by the administrator using a permissions configurator. Thus many users are able to access, interact with and author data structures and data sets at the same time when disconnected from the Internet and accordingly disconnected from each other, and then synchronize to share the data structures and data sets when connected to the Internet and accordingly with each other.

Referring back to FIG. 3, many field personnel execute and administer construction field operations, such as Commissioning 67. For example, in a Mechanical Commissioning field operation, the invention allows end-users to author and access unique data sets, such as System Status, System Status Dates and Times, Equipment Status and Equipment Status Dates and Times, relevant to and material in value to the construction Mechanical Commissioning. The unique data structures and data sets, related to one or may field operations, authored out in field, on the job site and at the point of construction, by construction field personnel, are then transferred from the Field Database 43 to the BIM Database 40 by the Integration Adapter 42 over the Internet 41, via either a wireless or wired connection. The unique data structures and data sets, related to one or may field operations, are associated with the unique Building Information Model objects representing building assemblies, systems, equipment and components. For example, with the Mechanical Model(s) 52, System Status, System Status Dates and Times, Equipment Status and Equipment Status Dates and Times related to Mechanical Commissioning are associated with each respective Air Handling Unit (AHU) object in the Building Information Model (BIM) and are able to be accessed directly within the Building Information Model (BIM) itself.

Business rules and business logic applied to the unique data structures and data sets, related to one or may field operations, are able to provide unique forms of reporting and visualization with the Building Information Models (BIM). For example, Air Handling Unit (AHU) objects in the Building Information Model (BIM) where Equipment Status="Pre-Functional Test" show in blue color and Air Handling Unit (AHU) objects in the Building Information Model (BIM) where Equipment Status="Functional Test" show in green=color (a concept known as "colorization" or visualization, analogous to a "heat map" or "weather map" of project status).

Further, to managing the synchronization of data structures and data sets, the present invention also allows end-users to associate documents or linkages to documents, such as operations and maintenance manuals, shop drawings, test reports, etc., with data structures and data sets of building assemblies, systems, equipment and components of a building project. The present invention automatically transfers first the links to and from documents, and second document files, associated with data structures and data sets in the Building Information Model (BIM), which allows end-users to manage and maintain documents connected or "tied" to the BIM. Thus the invention generates a "virtual scaffolding" of document links and documents around the data structures and data sets of building assemblies, systems, equipment and components and other information in the BIM, which allows end-users to access, manage and maintain documents connected or "tied" to the BIM, during construction and post-handover for ongoing operations and maintenance for the lifecycle of the building.

Figure 4:
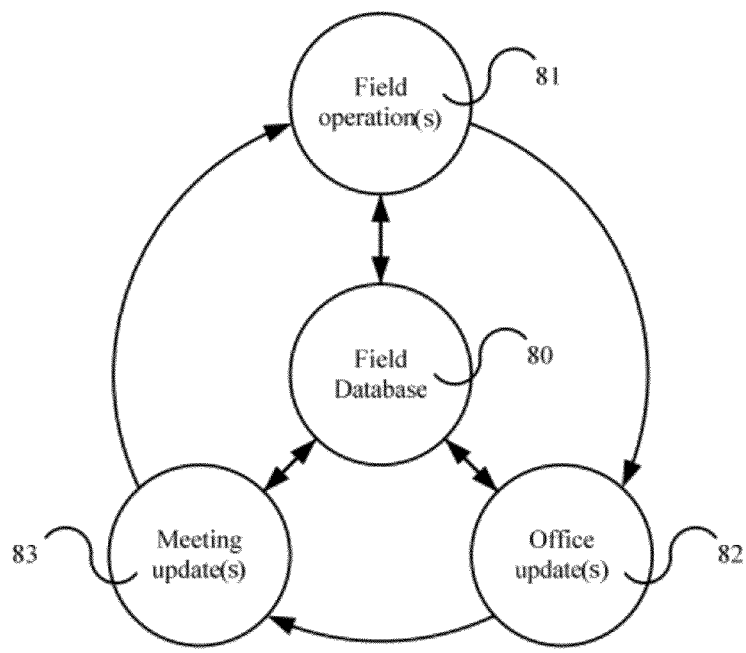
FIG. 4 is a drawing showing a unique workflow process cycle enabled by the present invention

Reference is now made to FIG. 4, which shows a unique workflow process cycle enabled by the present invention. Construction field personnel execute and administer construction Field operations 81 out in field, on the job site and at the point of construction, with the present invention. Field operations 81 include but are not limited to Issue Tracking, Field Report, Materials Tracking, Safety, Quality Assurance (QA), Quality Control (QC), Work List, Commissioning (Cx), Punch List, and Handover. The unique data structures and data sets, related to one or many Field operation(s) 81, authored out in field, on the job site and at the point of construction, are shared by many construction field personnel in a centralized and hosted Field Database 80 hub, for example about Air Handling Units (AHUs). Office update(s) 82 are made by construction field personnel, in the job site office or job trailer, for example about Air Handling Units (AHUs). Office update(s) 82 are made to the centralized Field Database 80, also shared by construction field personnel for Field operation(s) 81. Meeting update(s) 83 are made by both construction field personnel and other project stakeholders, such as owners, architects, engineers, virtual design coordinators and other consultants. Meeting update(s) 83 are made to the centralized Field Database 80, also shared by construction field personnel for Field operation(s) 81 and Office update(s) 82.

Construction field personnel and other project stakeholders are able to identify the current status of systems and equipment in real-time or in right-time, and move construction work tasks and activities in the schedule forward based on the current Status of the Air Handling Units (AHUs). Then, construction field personnel are able to manage, track and task work from the Meeting update(s) 83 back out to the Field operation(s) 81, via the Field Database 80 hub, as the cycle begins again. The centralized Field Database 80, shared by construction field personnel and other project stakeholders, enables a new form of database-driven field operations, as opposed to document-driven field operations with digital files and paper print outs. Information exchange of unique data structures and data sets, related to one or many Field operation(s) 81, is in real-time or in right-time, between construction field personnel and other project stakeholders from Field operation(s) 81 to Office update(s) 82 to Meeting update(s) 83, and then back out to Field operation(s) 81.

Figure 5:
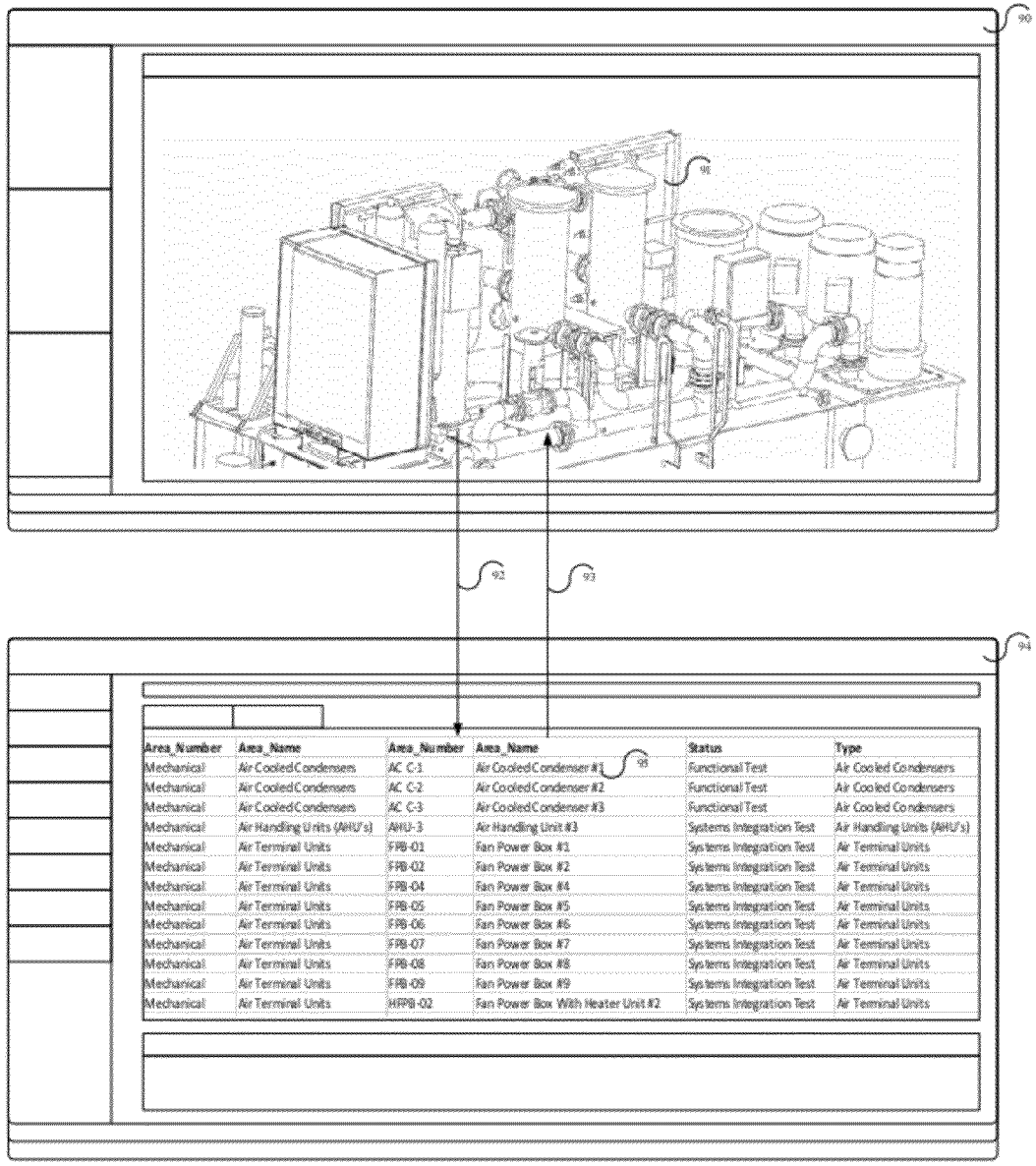
FIG. 5 is a drawing showing a representation of graphical user interfaces and data displays of an example BIM database application and of the field database software application of the present invention

Reference is now made to FIG. 5, which shows a representation of graphical user interfaces (GUIs) and data displays of an example BIM database application and of the field database software application of the present invention. Data structures and data sets of Building Information Model objects in the BIM Database Software Application 90 are transferred 92 to the Field Database Software Application 94. The unique data structures and data sets, related to one or may field operations, authored out in field, on the job site and at the point of construction, by construction field personnel, are then transferred 93 from the Field Database Software Application 94 back to the respective Building Information Model objects in the BIM Database Software Application 90.

In the graphical user interface of the BIM Database Software Application 90, the data structures and data sets of Building Information Model objects are generally represented by visual or pictorial, three-dimensional (3D) shapes including building geometry and spatial relationships 91. In the graphical user interface (GUI) of the Field Database Software Application 94, the unique data structures and data sets, related to one or may field operations, and associated with respective Building Information Model objects are generally represented in a tabular format with text values in columns and rows 95 or a list view. Building Information Model data structures and data sets are translated from shapes 91 to text 95, retaining the hierarchical relationships of the Building Information Model. Then, text and text-based values 95 are transferred back 93 to the associated objects in the Building Information Model.

As the Building Information Model objects are generally represented in a tabular format with text values in columns and rows 95 in the present invention, field personnel, generally with low technology and software knowledge, are able to execute and administer construction field operations in the present invention with minimal skill and nominal training. The tabular format with text values in columns and rows 95 facilitates use by construction field personnel and generally lowers barriers to adoption, compared to the visual or pictorial, three-dimensional (3D) shapes format.

Figures 6, 7:
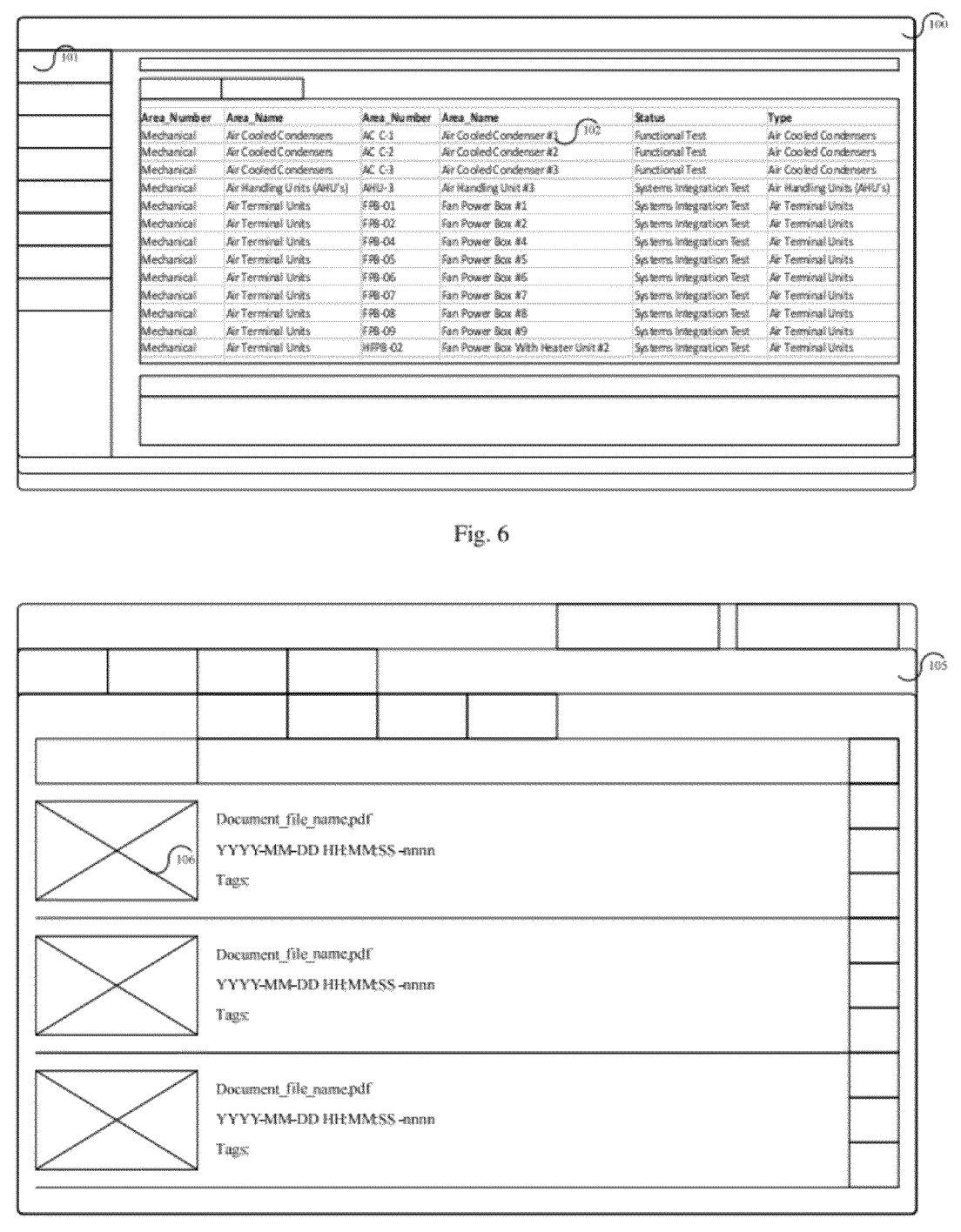

Reference is now made to FIG. 6, which shows a representation of the general graphical user interface and list view data display of the field database software application of the present invention. Large scale buttons 101, on the left side for example, provide for large targets on touch-sensitive and stylus-sensitive displays on mobile computer hardware or mobile form factors, such as Tablet Personal Computers (Tablet PCs), "smart" phones and cellular phones. Large scale buttons 101 facilitate use on mobile platforms with portable displays, outdoors, sometimes under direct sunlight or inclement weather, in the construction job site environment. The tabular format with text values in columns and rows 95 facilitates use by construction field personnel and generally lowers barriers to adoption. The tabular format is faster and easier to navigate, search and read through a large amount of information in a list format, filtered, grouped and sorted as required, than in a three-dimensional (3D) shapes format.

Reference is now made to FIG. 7, which shows a representation of the detail user interface for attachment and linked documents and other files of the field database software application of the present invention. One or many attachments and linked documents may be associated with each data element, in the data structures and data sets of the BIM. The user interface of the present invention includes a thumbnail image or preview of each document 106, and other meta-data about the document such as the file name, file type, file format, file size, file date and time created, file date and time last modified, file date and time last accessed, file authored by, file last modified by, and tags or non-hierarchical keywords or terms assigned to each file, to aid in searching, finding and browsing for the file in the future by the author or by other end-users. Documents and linkages to documents may include operations and maintenance manuals, shop drawings, test reports, for example, associated with data structures and data sets of building assemblies, systems, equipment and components of a building project.

Figure 8:
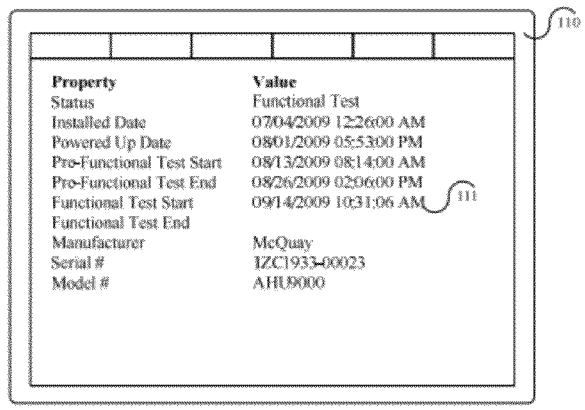
FIG. 8 is a drawing showing a representation of the detail user interface for data sets passed from the field database software application of the present invention to an example BIM database application.

Reference is now made to FIG. 8, which shows a representation of the detail user interface 110 for data sets passed from the field database software application of the present invention to an example BIM database application. In a Commissioning construction field operation example, data fields 111 include current Status, Installed Date date and time stamp, Powered Up Date date and time stamp, Pre-Functional Test Start date and time stamp, Pre-Functional Test End date and time stamp, Functional Test Start date and time stamp, Functional Test End date and time stamp, Manufacturer name, Serial # and Model #, associated with a unique piece of physical equipment in the building and its unique virtual model object in the BIM database. The detail user interface is designed to be easy to learn, easy to remember and easy to use by field personnel generally with low technology and software knowledge and skill and nominal training, and responsible for construction field operations. The detail user interface (UI) lists each Property of field name in the left hand column and its current Value in the right hand column.

Figure 9:
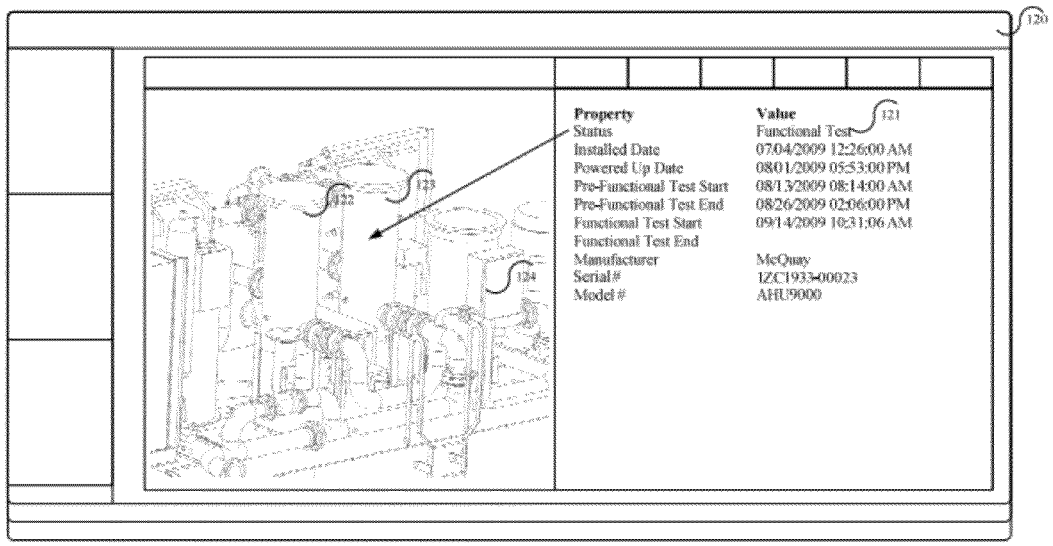
FIG. 9 is a drawing showing a representation of a user interface for an example BIM database application with visualization of model objects from business rules and logic by the field database software application of the present invention.

Reference is now made to FIG. 9, which shows a representation of a user interface 120 for an example BIM database application with visualization of model objects from business rules and logic by the field database software application of the present invention. In a Commissioning construction field operation example, the Status value 121 of each unique virtual model object in the Field database determines its color 122, 123, 124 in the BIM Database, thereby creating a virtual "heat map" or virtual "weather map" of the current status systems and equipment in the physical construction. In a Commissioning construction field operation example, if the current Status value=Functional Test, then the associated model object renders in a green color. If the current Status value=Pre-Functional Test, then the associated model object renders in a blue color. If the current Status value=Powered Up, then the associated model object renders in a red color. If the current Status value=null or no value, then the associated model object renders in a grey color.

Incorporation by Reference

References and citations to other documents, such as patents, patent applications, patent publications, journals, books, papers, web contents, have been made throughout this disclosure. All such documents are hereby incorporated herein by reference in their entirety for all purposes.

Equivalents

The invention may be embodied in other specific forms without departing from the spirit or essential characteristics thereof. The foregoing embodiments are therefore to be considered in all respects illustrative rather than limiting on the invention described herein.

EXAMPLES

Example 1

Filtering and Updating

The following explains filtering using systems of the invention and how systems of the invention receive data from people associated with a construction project and then update the data structures and data sets with the newly received user input. These functions occur after the data structures and data sets received from the Building Information Modeling software have been encoded and mapped.

The following terms are used in the code below.

Selection Set: This is a filter created in the model. It contains a list of model objects that will be updated by a plug-in.

Attribute/Property: The data passed from systems of the invention is stored as properties for model objects. Each object in the model has its own set of properties. These are categorized under a group called "Attributes". When data is added from systems of the invention, the data is stored in an attribute called "Vela". To this attribute, all data is added as "property name" and "value".

During a first request from the Building Information Modeling software to systems of the invention, the Building Information Modeling software will send the following data as POST Parameters and the list of all selection set names as JSON array.

```
POST Parameters: bim_file_name, bim_file_modified_time,
bim_app_name, bim_app_version,plug_in_version
JSON: bim_object_groups = ['Selection Set1', 'Selection Set2','Selection Set3']
```

This is the response for the first request from mapped_sets method (from systems of the invention to the Model). The response contains:

```
mapped_sets (This alone is a JSON);
document_id (This is one of the parameters); and
bim_file_modifiedTime (TBD).
```

There are two hashes, instructions and equipment. Instructions include information about the Selection Sets to be updated in the model, the properties to create for the model objects, the properties to get from model objects and unique identifier of the model object. This includes 'bim_object- _groups' hash, whose value is an array of Selection Sets. Each array element includes Selection Set Name and a hash of (ID, to_vela and to_bim). ID represents the model object's ID name in the format of Attribute Name and Property Name. to_vela is an array of property names to get from the model. to_bim is an array of property names to add to the model.

Equipment includes data to be added/updated to the model. The data is a hash of 'properties' and 'links'. The 'properties' is again a hash. This will contain list of property names and values that will be added to model objects. The 'links' is an array of name and URLs.

The code is as follows:

```
ms = {
    'instructions' => {
        'bim_object_groups' => [
            ['Selection Set1', {
                'key' => 'Element:TBC Workstation #',
                'to_vela' => [
                    'Element:Name', 'Element:TBC ZONE',
                    'MFG:Comments', 'MFG:Cost', 'Element:Level'],
                'to_bim' => [
                    'Status', 'Install Date']
                }
            ],
            ['Selection Set2', {
                'key' => 'Element:TBC Phase #',
                'to_vela' => [
                    'Element:Name', 'Element:TBC ZONE',
                    'MFG:Diameter', 'MFG:CostPerFoot', 'Element:Level'],
                'to_bim' => [
                    'Status', 'Install Date', 'Install Complete']
                }
            ]
        ]
    },
    'equipment' =>
    {
        '3-1113' => {
            'properties' => {
                'Status' => 'Pre-functional-test updated',
                'Install Date' => '2011-01-21'},
            'links' => [
                ['f_1', 'http://cassie.velasystems.com/lib/76dhd7s'],
                ['f_2', 'http://cassie.velasystems.com/lib/78f7ddy']]
        },
        '3-1110' => {
            'properties' => {
                'Status' => 'Acceptance'}
        },
        '3-1095' => {
            'properties' => {
                'Status' => 'Accepted',
                'Install Date' => '2010-11-13',
                'Install Complete' => 'N'}
        }
    }
}
document_id = '12345678-90ab-cdef-1234-567890abcdef'
```

After receiving these instructions, the plug-in updates the model and then issues a request to update_sets method. During this request, the plug-in sends back the data requested from the model and the result of the 'update model' operation. If any error occurs during update, it'll be sent to VFM(TBD).

Below is the instructions that are sent during the first request to update_sets method. It includes a hash of equipment and a document ID. The equipment has the data requested from the model. It is a hash of object ID and the value is a hash of property names and values. The property name is in the format—'Attribute:Property'. This relates to interfacing with the Building Information Modeling software. The plug-in returns back the document ID.

The code is as follows:

```
ms = {
    'equipment' =>
    {
        '3-1113' => {
            'Element:Name' => 'ACU-1-1',
            'Element:TBC ZONE' => 'Zone 1',
            'MFG:Comments' => 'Comment',
            'MFG:Cost' => '2000',
            'Element:Level' => 'Floor3'
        },
        '3-1110' => {
            'Element:Name' => 'ACU-1-2',
            'Element:TBC ZONE' => 'Zone 1',
            'MFG:Comments' => 'Comment',
            'MFG:Cost' => '2030',
            'Element:Level' => 'Floor3'
        },
        '3-1095' => {
            'Element:Name' => 'ACU-1-40',
            'Element:TBC ZONE' => 'Zone 3',
            'MFG:Diameter' => '200',
            'MFG:CostPerFoot' => '245',
            'Element:Level' => 'Floor3'
        },
        '2-1076' => {
            'Element:Name' => 'ACU-1-40',
            'Element:TBC ZONE' => 'Zone 3',
            'MFG:Diameter' => '200',
            'MFG:CostPerFoot' => '200',
            'Element:Level' => 'Floor2'
        },
        '2-1077' => {
            'Element:Name' => 'ACU-1-40',
            'Element:TBC ZONE' => 'Zone 3',
            'MFG:Diameter' => '200',
            'MFG:CostPerFoot' => '230',
            'Element:Level' => 'Floor2'
        }
    },
    'document_id' => '12345678-90ab-cdef-1234-567890abcdef'
}
```

What is claimed is:

1. A computer-implemented method comprising:
mapping a plurality of data structures and data sets of one or more building assemblies from a first database to a remote second database;
receiving input from a user to modify a set of rules and modifying the set of rules based on the input;
selecting one or more of the mapped data structures and data sets from the first database that are relevant to a building construction field operation using the modified set of rules;
transmitting the selected data structures and data sets to a user terminal of the user;
receiving, from the user terminal, one or more user modifications to one or more of the selected data structures and data sets; and
synchronizing and updating the data structures and data sets in the first database based on the received modifications.

2. The method according to claim 1, further comprising associating one or more documents with the selected data structures and data sets.

3. The method according to claim 2 wherein each of the documents is one of an operations and maintenance manual, a shop drawing, or a test report.

4. The method according to claim 1, further comprising associating one or more videos with the selected data structures and data sets.

5. The method according to claim 1, wherein the selected data structures and data sets relate to Heating, Ventilating, and Air-Conditioning (HVAC) assemblies.

6. The method according to claim 1, wherein the field operation is systems commissioning, issue tracking, field reports, materials tracking, safety, quality assurance, quality control, work lists, punch lists, or handover.

7. The method according to claim 1, wherein the user terminal is a device that comprises a display and is capable of receiving data transferred via an internet or cellular connection.

8. The method according to claim 7 wherein the user terminal is a tablet computer, or a portable handheld device.

9. The method according to claim 8, wherein the portable handheld device is a smart phone.

10. A system comprising:
one or more computers programmed to perform operations comprising:
mapping a plurality of data structures and data sets of one or more building assemblies from a first database to a remote second database;
receiving input from a user to modify a set of rules and modifying the set of rules based on the input;
selecting one or more of the mapped data structures and data sets from the first database that are relevant to a building construction field operation using the modified set of rules;
transmitting the selected data structures and data sets to a user terminal of the user;
receiving, from the user terminal, one or more user modifications to one or more of the selected data structures and data sets; and
synchronizing and updating the data structures and data sets in the first database based on the received modifications.

11. The system of claim 10, wherein the operations further comprise associating one or more documents with the selected data structures and data sets.

12. The system of claim 11 wherein each of the documents is one of an operations and maintenance manual, a shop drawing, or a test report.

13. The system of claim 10, further comprising associating one or more videos with the selected data structures and data sets.

14. The system of claim 10 wherein the selected data structures and data sets relate to Heating, Ventilating, and Air-Conditioning (HVAC) assemblies.

15. The system of claim 10 wherein the field operation is systems commissioning, issue tracking, field reports, materials tracking, safety, quality assurance, quality control, work lists, punch lists, or handover.

16. The system of claim 10 wherein the user terminal is a device that comprises a display and is capable of receiving data transferred via an internet or cellular connection.

17. The system of claim 16 wherein the user terminal is a tablet computer, or a portable handheld device.

18. The system of claim 17 wherein the portable handheld device is a smart phone.

19. Computer program code stored on one or more non-transitory computer-readable mediums which, when executed by one or more computers, cause the computers to perform operations comprising:
mapping a plurality of data structures and data sets of one or more building assemblies from a first database to a remote second database;
receiving input from a user to modify a set of rules and modifying the set of rules based on the input;
selecting one or more of the mapped data structures and data sets from the first database that are relevant to a building construction field operation using the modified set of rules;
transmitting the selected data structures and data sets to a user terminal of the user;
receiving, from the user terminal, one or more user modifications to one or more of the selected data structures and data sets; and
synchronizing and updating the data structures and data sets in the first database based on the received modifications.

20. The computer program code of claim 19, wherein the operations further comprise associating one or more documents with the selected data structures and data sets.

21. The computer program code of claim 20 wherein each of the documents is one of an operations and maintenance manual, a shop drawing, or a test report.

22. The computer program code of claim 19, further comprising associating one or more videos with the selected data structures and data sets.

23. The computer program code of claim 19 wherein the selected data structures and data sets relate to Heating, Ventilating, and Air-Conditioning (HVAC) assemblies.

24. The computer program code of claim 19 wherein the field operation is computer program codes commissioning, issue tracking, field reports, materials tracking, safety, quality assurance, quality control, work lists, punch lists, or handover.

25. The computer program code of claim 19 wherein the user terminal is a device that comprises a display and is capable of receiving data transferred via an internet or cellular connection.

26. The computer program code of claim 25 wherein the user terminal is a tablet computer, or a portable handheld device.

27. The computer program code of claim 26 wherein the portable handheld device is a smart phone.

* * * * *